US006173322B1

(12) United States Patent
Hu

(10) Patent No.: US 6,173,322 B1
(45) Date of Patent: Jan. 9, 2001

(54) NETWORK REQUEST DISTRIBUTION BASED ON STATIC RULES AND DYNAMIC PERFORMANCE DATA

(75) Inventor: Wei-Ming Hu, Palo Alto, CA (US)

(73) Assignee: Silicon Graphics, Inc., Mountain View, CA (US)

( * ) Notice: Under 35 U.S.C. 154(b), the term of this patent shall be extended for 0 days.

(21) Appl. No.: 08/866,247

(22) Filed: Jun. 5, 1997

(51) Int. Cl.[7] .............................. G06F 13/14; G06F 11/30
(52) U.S. Cl. .................. 709/224; 709/217; 709/223; 709/225; 709/226; 709/229
(58) Field of Search .................... 709/223, 224, 709/225, 203, 217, 226, 229

(56) References Cited

U.S. PATENT DOCUMENTS

| 5,548,724 | * | 8/1996 | Akizawa et al. ...................... 395/675 |
| 5,668,951 | * | 9/1997 | Jain et al. ............................. 709/224 |
| 5,696,701 | * | 12/1997 | Burgess et al. ....................... 709/224 |
| 5,740,371 | * | 4/1998 | Wallis ................................... 709/229 |
| 5,774,660 | * | 6/1998 | Brendel et al. ....................... 395/675 |
| 5,802,302 | * | 9/1998 | Waclawsky et al. ................. 709/203 |
| 5,812,776 | * | 9/1998 | Gifford ................................. 709/217 |
| 5,819,255 | * | 10/1998 | Celis et al. . |
| 5,925,102 | * | 7/1999 | Eilert et al. .......................... 709/226 |
| 5,951,694 | * | 9/1999 | Choquier et al. .................... 709/203 |

OTHER PUBLICATIONS

Luotonen et al, "World–Wide Web Proxies", pp. 1–8, Apr., 1994.*

* cited by examiner

Primary Examiner—Mark H. Rinehart
Assistant Examiner—Almari Romero
(74) Attorney, Agent, or Firm—Sterne, Kessler, Goldstein & Fox P.L.L.C.

(57) ABSTRACT

A system and method for the distribution of client requests received from a digital computer network provides an intermediary between the client and one or more content servers that actually service the client request. Client requests are distributed amongst groups of content servers according to a one or more static rules. These static rules are applied to determine which group of content servers will service each client request. Content servers may be grouped without regard to hardware configuration and without regard to where the content server resides within the network. Client requests may be distributed amongst the content servers within each group according to a dynamic metric. The dynamic metric includes time-varying measurements of the available processing capacity of each content server within a group. Client requests may then be distributed to those content servers within a group that are best able to handle additional processing burdens. The available processing capacity of each content server is measured without requiring special software to be installed in the content servers, and without unduly increasing network message traffic. Connections may be established with content servers in one of two modes: a proxy mode where the present invention acts on behalf of the client by having the client request serviced, and a redirect mode where the present invention returns to the client whatever information is required to enable the client to establish a direct connection with the content server.

33 Claims, 12 Drawing Sheets

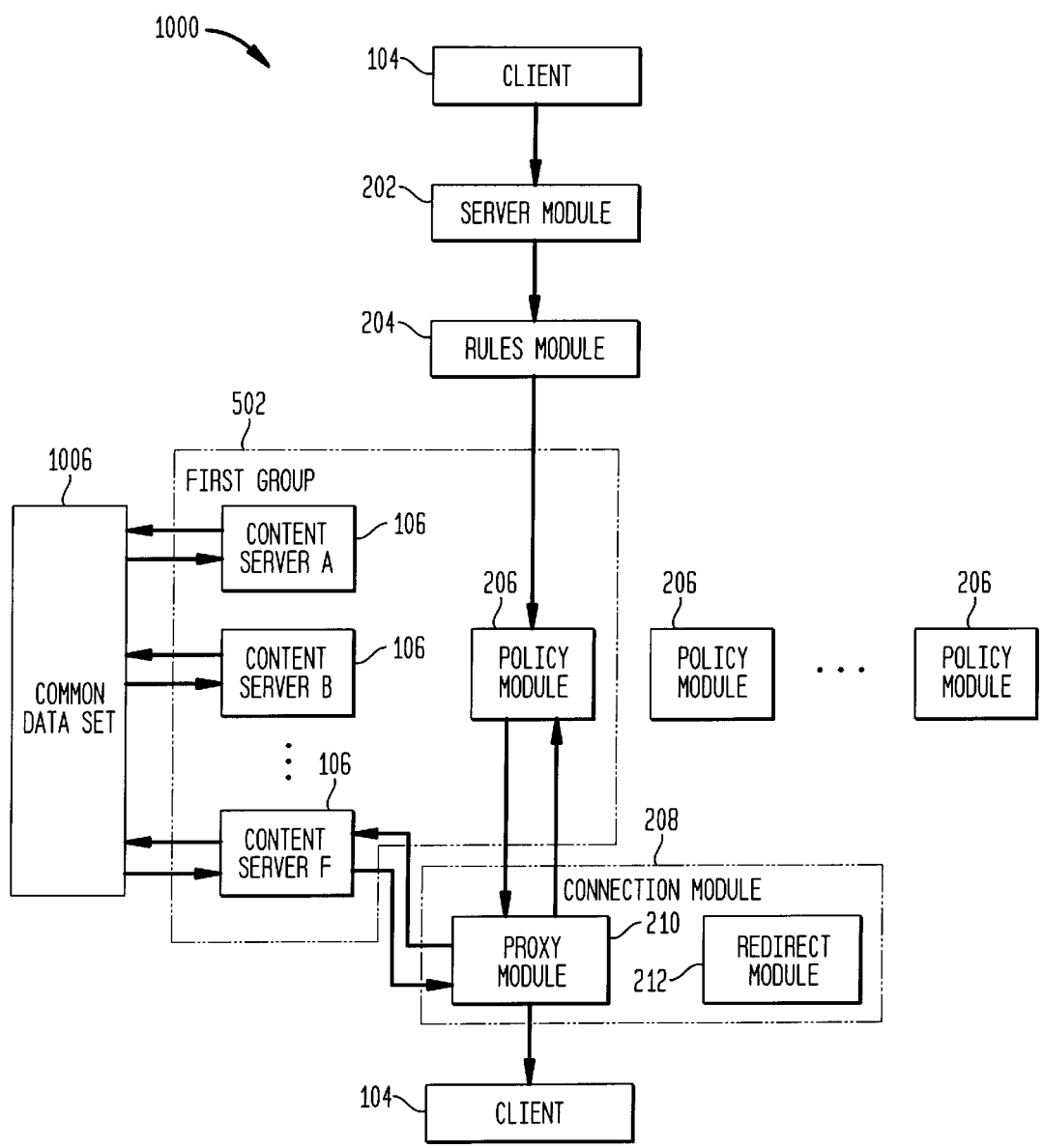

NETWORK REQUEST DISTRIBUTION BASED ON STATIC RULES AND DYNAMIC PERFORMANCE DATA

BACKGROUND OF THE INVENTION

1. Field of the Invention

The present invention relates generally to network servers, and more particularly to the distribution of client requests received from a network to a number of content servers based on one or more static rules and dynamic performance data.

2. Related Art

Today, millions of computer-users worldwide are communicating via the Internet. The Internet provides an unparalleled medium for the exchange and dissemination of ideas, for cheap and efficient long-distance communication, and for the conduct of business. Many entities in the public, private, and governmental sectors are rushing to establish a presence on the Internet.

However, the growth of computer networks is not limited to the Internet alone. Many are finding that additional efficiencies may be realized from computer resources when in-house computers are linked by a network. Businesses, governmental agencies, and academic institutions are all creating vast internal networks to increase the flow of information between their employees or students. In many instances, these networks are accessible to the general public as well.

Those wishing to establish a site on the Internet (i.e., a "web site") must have some means for handling the requests directed to the web site from other network users (i.e., "client requests"). This job of handling client requests becomes complicated when these requests may actually be serviced by a computer, or one of many computers, other than the computer running the web site software. These computers will hereinafter be referred to as "content servers," as they are the machines responsible for providing the content that is the subject of the client request.

Many software products are available today which are capable of distributing client requests amongst multiple content servers. However, these products suffer from numerous drawbacks. First, some existing products are only able to distribute client requests amongst content servers which are of identical hardware design. Others are only able to distribute client requests amongst geographically co-located content servers. Still others are limited to content servers running the same software and having access to identical data. Obviously, these restrictions can be extremely limiting where the web site owner has many content servers, including a variety of hardware and software configurations, geographically dispersed in a number of distant locations.

Some existing products do not consider the processing loads carried by, or even the availability of, content servers when determining which will service a particular client request. Other products rely solely on pre-defined static rules to determine how client requests are distributed rather than altering the distribution based on dynamic changes within the network environment. Still other products are unable to base distribution decisions on the nature of the client request (i.e., sending certain types of client requests to certain content servers).

Conventional products suffer other disadvantages as well. Some are unable to successfully redistribute client requests when the first content server fails. Some require special software to be installed on each content server to report data to the central request handler. Other are inefficient in terms of message traffic sent across the network.

A need exists for an improved system and method for distributing client requests which addresses these problems. The system and method should be able to distribute client requests to content servers of various hardware and software design, and without geographical limitation so long as the content server is accessible via a network.

Further, as web sites become increasingly complex and the flow of client requests swells, those managing the web site would benefit greatly from having sophisticated, customizable software for determining how these burdens are distributed across the content servers tasked to handle these requests. The distribution should be based on both pre-defined static rules, and content server performance data monitored over time. The desired distribution should be achieved without requiring special software to be installed on each content server, and without unduly increasing network message traffic.

Thus, what is required is an improved system and method for distributing client requests to a variety of content servers according to static rules and dynamic monitoring of content server performance.

SUMMARY OF THE INVENTION

Briefly stated, the present invention is directed to a system and method for the distribution of client requests received from a digital computer network. The present invention acts as an intermediary between the client and one or more content servers which actually service the client request.

A feature of the present invention is that client requests are distributed amongst groups of content servers according to one or more static rules. The present invention applies these static rules to determine which group of content servers will service each client request. Content servers may be grouped arbitrarily, so long as each content server within a group is capable of servicing all the client requests sent to that group.

An advantage of the present invention is that subject to the restriction that each content server within a group be capable of servicing all client requests sent to that group, content servers may be grouped without regard to hardware configuration and without regard to where the content server resides within the network. In other words, a single group may include content servers configured of various hardware. A single group may also include content servers accessible via a local network, and other content servers accessible via a wide-area network.

Another feature of the present invention is that client requests may be distributed amongst the content servers within each group according to a dynamic metric. The present invention forms the dynamic metric based on measurements made over time of the available processing capacity of each content server within a group. Client requests may then be distributed to those content servers within a group that are best able to handle additional processing burdens.

An advantage of the present invention is that the available processing capacity of each content server is measured without requiring special software to be installed in the content servers, and without increasing network message traffic over and above that already required to process client requests.

Another feature of the present invention is that content server failures are handled without disrupting the client. The present invention detects in an efficient manner when content servers fail and when they return to service.

Another feature of the present invention is that connections may be established with content servers in one of two modes. In a proxy mode, the present invention acts on behalf of the client by forwarding the client request to a content server for servicing, then returns the results of the servicing to the client. In a redirect mode, the present invention returns to the client whatever information is required to enable the client to establish a direct connection with the content server.

Another feature of the present invention is that frequently accessed data may be stored in a cache for quick retrieval. Data accessed by client requests may be cached, as well as network connections to content servers. With respect to the latter, significant time savings may be realized by holding open frequently used network connections for some period of time and storing data related to these connections.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIG. 10 is a data flow diagram illustrating the operation of the present invention in a proxy mode;

DETAILED DESCRIPTION OF THE PREFERRED EMBODIMENTS

Overview of the Environment

Figure 1:
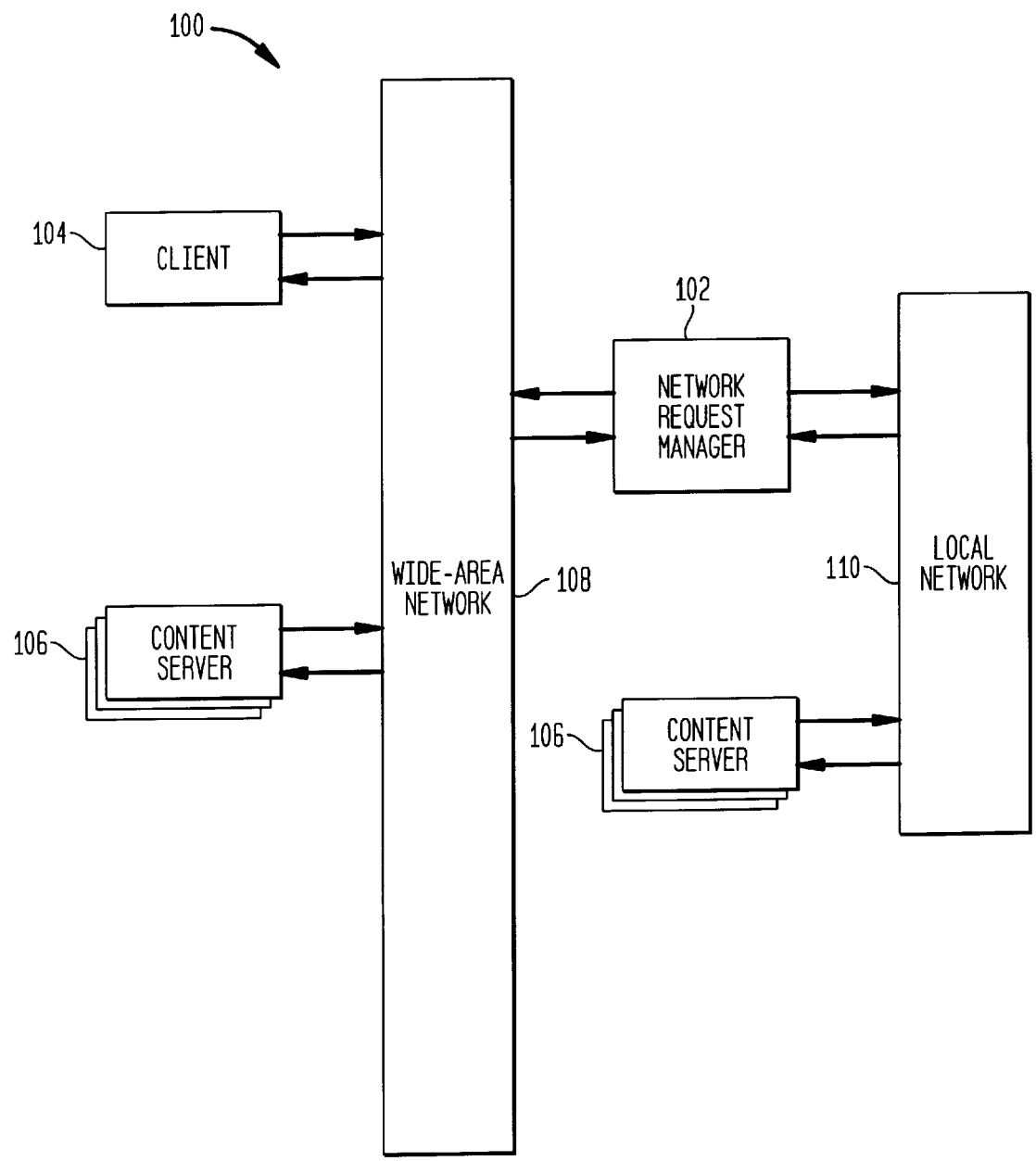
FIG. 1 is a block diagram of a digital network environment within which the present invention is used.

FIG. 1 is a block diagram of a digital network environment 100 within which the present invention is used. Network request manager 102 acts as an intermediary between a client 104 and one or more content servers 106. Network request manager 102 handles all client requests directed to a web site on wide-area network 108, selects a content server 106 to service each request, and causes a connection to be established with the selected content server 106 so that the request may be fulfilled.

Client 104 represents any digital computer that is capable of communicating with network request manager 102 according to the particular network protocol followed by wide-area network 108. For example, client 104 might be a personal computer using a modem to communicate via wide-area network 108. As depicted in FIG. 1, client 104 is connected to wide-area network 108 for two-way communication. The network software employed by client 104 locates the web site operated by network request manager 102 and sets up a two-way network connection. Client 104 may then transmit a client request to the web site which will be serviced by one of the content servers 106.

The client request might be a request to read (or write) certain data, a request to engage a particular interactive application, the exchange of information between client 104 and an interactive application, or any other interaction between two computers contemplated by those skilled in the art. The actions taken by content server 106 to satisfy the client request will be referred to collectively as "servicing" a client request.

Content servers 106 provide the content sought by the client request. Most typically, content server 106 is a conventional file server (i e., a computer which accesses a large digital memory, such as a hard disk). A typical client request might be to retrieve a particular file stored on disk, which the file server accesses and returns in response to the request. Another example content server 106 might be a computer configured to efficiently run a particular software application, such as a database program. Those skilled in the art will recognize the wide range of possible implementations for content servers 106.

Network request manager 102 may represent as many content servers 106 as is required by a given web site. The total number is limited in practice by the available processing capacity of network request manager 102: a greater number of content servers 106 requires that network request manager 102 be able to process a greater number of client requests. Further, network request manager 102 preferably operates with a known, finite set of content servers 106. Those skilled in the art, however, will recognize that other embodiments might allow for a number of content servers which varies over time.

Wide-area network 108 and local network 110 both represent digital communication pathways. The descriptors "wide" and "local" are used herein merely for convenience to illustrate the most likely environment in which the present invention would be implemented. An example wide-area network might be a Transmission Control Protocol/Internet Protocol (TCP/IP) network, such as the Internet. An example local network might be a local area network (LAN), a parallel bus physically connecting several computers in close geographical proximity, or a high-speed interconnect between the CPUs in a multi-CPU computer.

Network request manager 102 most commonly would operate as a web site on a TCP/IP network. Content servers 106 accessible via the web site might be located anywhere network request manager 102 is connected via a communication pathway. For instance, the computer which operates as the network request manager 102 may also act as a content server 106. Further, a content server 106 may be connected to the network request manager 102 via a parallel bus, accessible via a LAN, or even accessible as a separate web site via a TCP/IP network.

However, those skilled in the art will recognize that the descriptors "wide" and "local" might be reversed in FIG. 1. That is, network request manager 102 might field client requests received via a LAN for content found on content servers 106 accessible solely via web sites on the Internet. Therefore, the descriptors "wide" and "local" are merely illustrative of the most likely implementation environment, but should not in any way be construed as a limitation on the manner in which the present invention might be implemented.

Overview of the Invention

Figure 2:
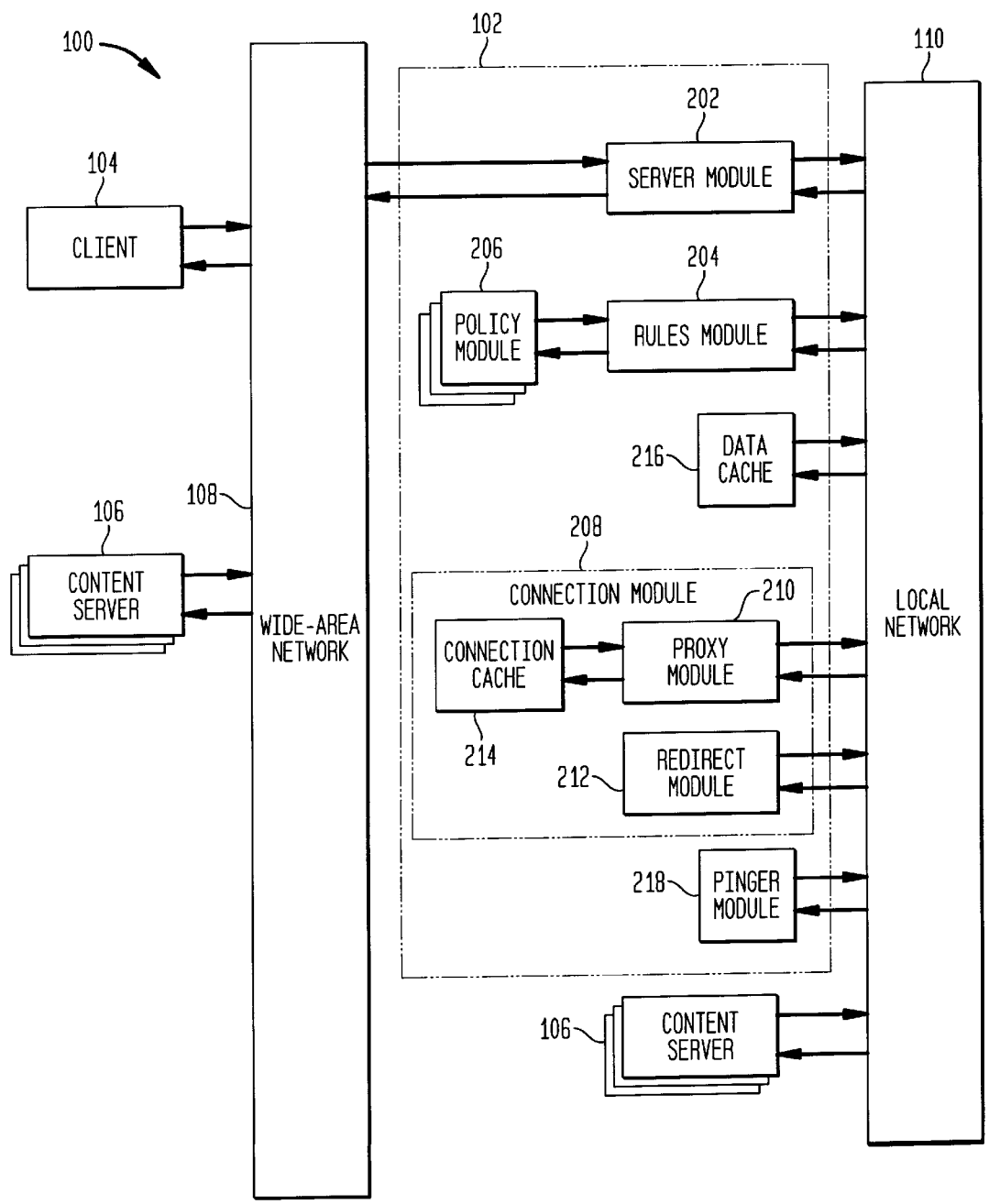
FIG. 2 is a block diagram illustrating the software components of network request manager within a digital network environment.

FIG. 2 is a block diagram illustrating the software components, or "modules," of the network request manager 102 in a digital network environment 100. Network request manager 102 includes a server module 202, a rules module 204, a policy module 206, a connection module 208 (including a proxy module 210, a redirect module 212, and a connection cache 214), a data cache 216, and a pinger module 218. This section briefly introduces each module; detailed descriptions are provided in the following sections.

Server module 202 receives a client request from client 104 via wide-area network 108. Server module 202 provides a conventional interface, such as the HyperText Transfer Protocol (HTrP), well known to those skilled in the art for communication with wide-area network 108 and client 104.

Rules module 204 and policy modules 206 select a content server 106 to service each client request. These modules implement a two-step approach: (i) apply one or more static rules to the client request to select a group of content servers, then (ii) select a particular content server from the selected group according to a dynamic metric. This two-step approach is described in detail below.

Connection module 208 causes a connection to be established with the particular content server 106 selected by rules module 204 and policy modules 206. In a preferred embodiment, connection module 208 employs either proxy module 210 or redirect module 212 to cause the connection to be established, depending upon whether certain redirection criteria have been satisfied.

Pinger module 218 monitors the status of each content server 106. The manner in which a particular content server 106 is monitored depends upon whether proxy module 210 or redirect module 212 was used to cause the connection to be established. Pinger module 218 notifies other interested modules when content servers 106 cease to respond, and when they once again are active.

In a preferred embodiment, network request manager 102 decreases the time required to respond to client requests by employing two caching schemes. First, data cache 216 selectively stores data that is the subject of client requests according to conventional caching techniques familiar to those skilled in the art. As with conventional data caches, when a client request is received, data cache 216 may be checked to determine whether the data that is the subject of the request is stored therein. If so, the read or write operation may take place immediately without having to contact a content server 106. Client requests which frequently access a common data set may therefore be serviced more quickly. Those skilled in the art will recognize that various techniques might be employed to improve the performance of data cache 216.

Second, connection cache 214 selectively stores connections established with content servers 106, again according to conventional caching techniques. Connection module 208 checks connection cache 214 before establishing a new connection with a selected content server. Connection cache 214 may therefore dispense with the need for re-establishing connections with frequently accessed content servers.

General Operation

Figure 3:
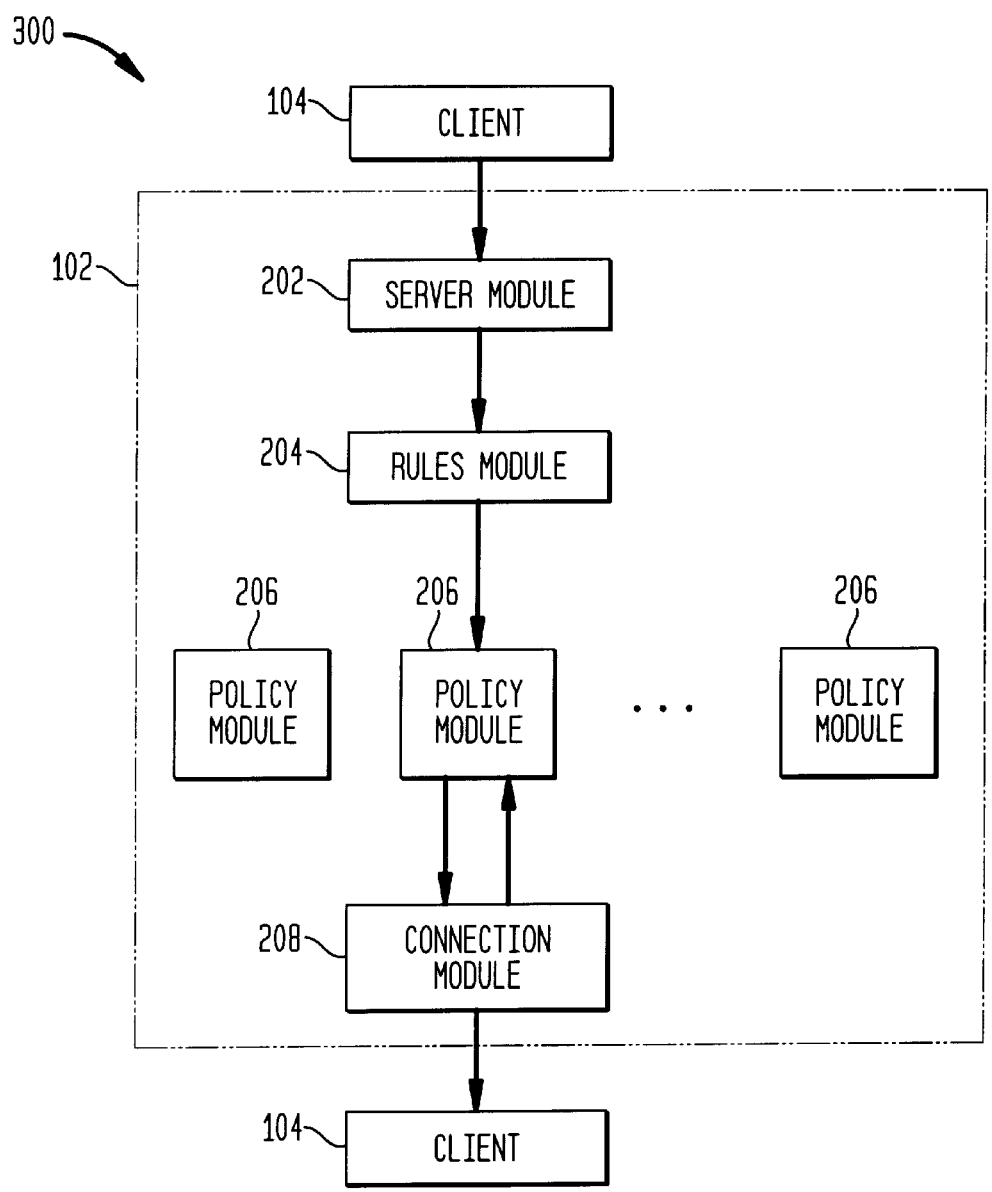
FIG. 3 is a data flow diagram illustrating the general operation of the present invention.

FIG. 3 is a data flow diagram 300 representing the general operation of the present invention. Data flow diagram 300 traces the path of a client request issued by client 104 through the present invention. The client request is handled by the various software components of network request manager 102: server module 202, rules module 204, policy modules 206, and connection module 208. Network request manager 102 responds to the client request with either the results of servicing the request, or with information which will allow client 104 to contact directly (ie., "redirection information") the content server 106 selected to service the request.

Each component of the network request manager 102 will now be described in further detail, following the general outline of data flow diagram 300.

In a preferred embodiment, each of the components described below is implemented as software running on a computer. Those skilled in the art will recognize that producing executable software based on the following functional descriptions is well within the purview of those skilled in the art.

The present invention is described in the context of a number of software components, each providing certain functionality. Often the line between the functionality of one component and the next is arbitrarily drawn, and is described as such purely for purposes of convenience. For instance, a function described as being performed by rules module 204 might equivalently be performed by a policy module 206 or server module 202. Those skilled in the art will note the importance of the function described, not the arbitrary grouping of functionality into software components.

Server Module

Figure 4:
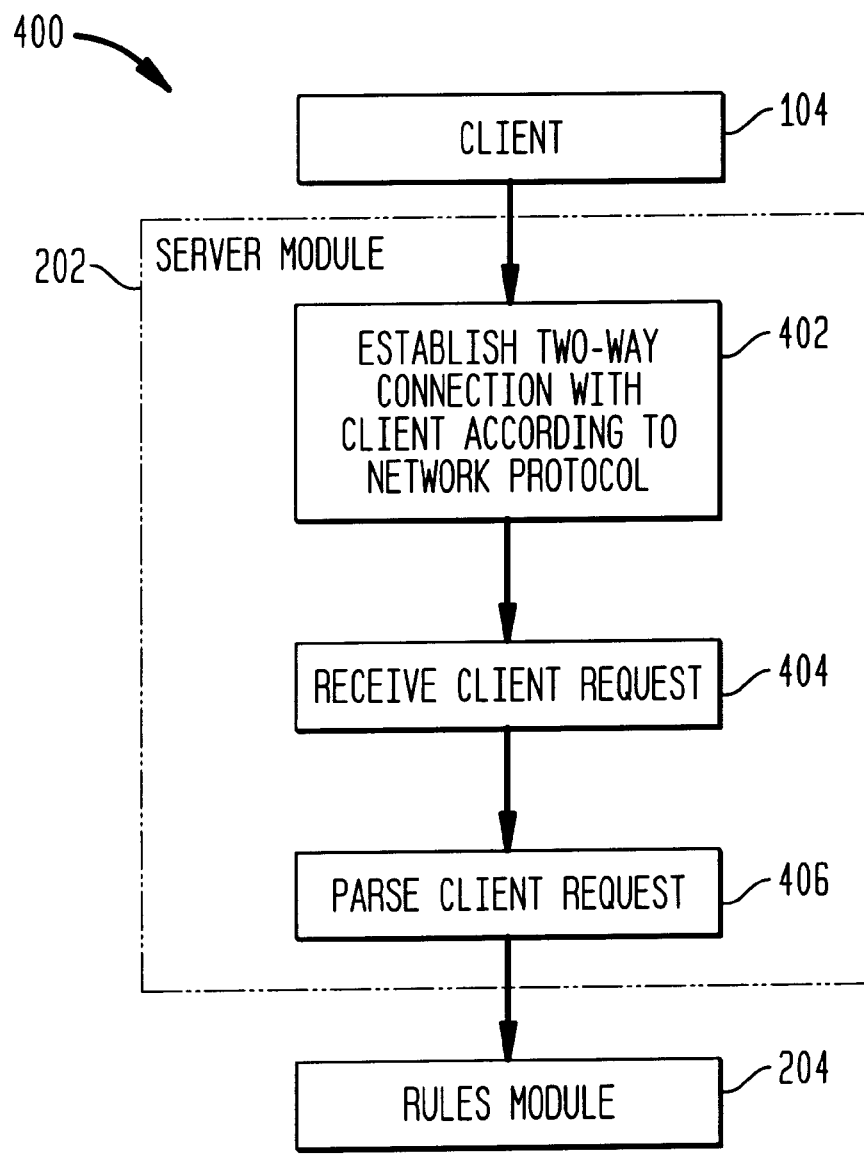
FIG. 4 is a data flow diagram providing further details related to the operation of the server module in a preferred embodiment.

FIG. 4 is a data flow diagram 400 illustrating in greater detail the operations performed by server module 202. In step 402, the network software of client 104 locates server module 202 and sets up a two-way network connection from client 104 to server module 202. This is accomplished according to the network protocol and name service followed by wide-area network 108.

Once this connection is established, client 104 in step 404 sends a client request to server module 202 according to the network protocol.

In step 406, server module 202 parses the client request. Those skilled in the art will recognize that a typical client request transmitted across a network might contain various pieces of information. For instance, the client request must include a description of the action that is being requested (e.g., get file). It must also include a description of the data that is to be operated upon (e.g., an address, a tag recognized as identifying particular data). In the case of HTTP requests, the location indicator is a uniform resource locator (URL).

The client request might also include various types of information related to client 104 (i.e., "client data"), including for example the type of network browser employed by client 104, the types of documents this browser can accept, and authorization information that server module 202 might require for continued processing of the client request. Those skilled in the art will recognize that the particular network protocol used by wide-area network 108 will define or limit the types of client data included within the client request.

As shown in FIG. 3, once server module 202 has received and parsed the client request, control passes to rules module 204. However, the grouping of content servers 106 is described in the next section before describing the operation of rules module 204.

Grouping Content Servers

Figure 5:
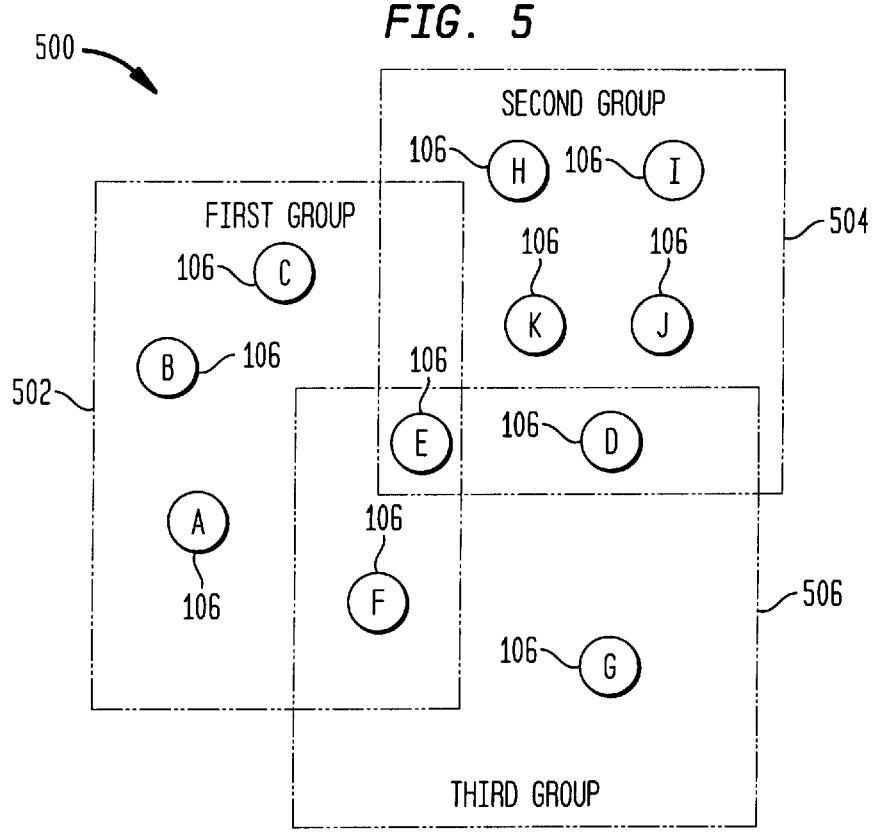
FIG. 5 is a diagram illustrating how content servers are divided into groups according to a preferred embodiment.

FIG. 5 is a diagram 500 illustrating how content servers 106 may be divided into groups. In the example depicted by diagram 500, network request manager 102 may access content in content servers 106 labeled alphabetically A through K.

In a preferred embodiment, content servers 106 may be grouped arbitrarily subject to one restriction: each content server 106 within a group must be able to service all requests sent to that group. In other words, each content server 106 within a group must be able to access a common data set. Note that the term "data set" here is used broadly, and might for example describe a common database or a common set of applications.

Further, it is the responsibility of rules module 204 to insure that the client requests sent to a group only require access to the data set common to that group. Enforcing this restriction insures that once a group is selected, any of the content servers 106 within that group may service the request.

In a preferred embodiment, no other restrictions are placed on how content servers 106 form groups. A single content server 106 might belong to multiple groups. As can be seen, content servers A, B, C, E, and F form a first group 502. Content servers D, E, H, I, J, and K form a second group 504. Content servers D, E, F, and G form a third group 506. Thus, content server F belongs to both first group 502 and third group 506, content server D belongs to both second group 504 and third group 506, and content server E belongs to all three. This is permissible so long as each content server can access the common data set of each group to which it belongs.

Content servers 106 within a group may be configured with different computer hardware. Each content server 106 may vary with respect to speed, I/O bandwidth, memory, operating system, and in any other way as might be contemplated by those skilled in the art. Again, the only restriction being that each content server 106 within a group must be able to access a data set common to that group.

Content servers 106 within a group may also be accessible via local network 110, or via wide-area network 108 as depicted in FIG. 1. The grouping of content servers 106 in a preferred embodiment is therefore very flexible.

Rules Module

Figure 6:
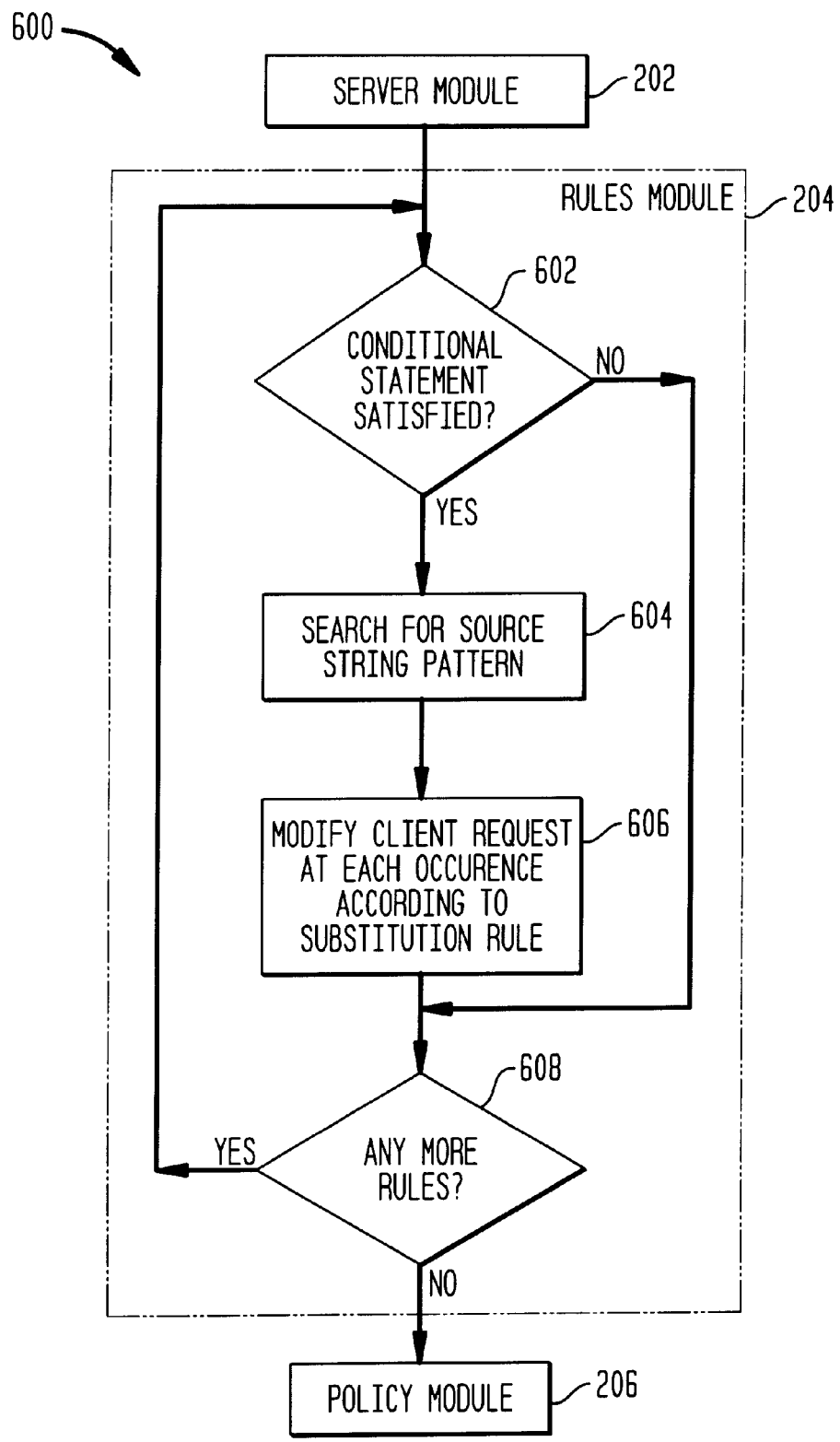
FIG. 6 is a data flow diagram providing further details related to the operation of the rules module in a preferred embodiment.

FIG. 6 is a data flow diagram 600 illustrating in greater detail the operations performed by rules module 204. Rules module 204 applies one or more static rules to the client request to determine which group of content servers will service the request. The rules applied by rules module 204 are termed "static" because these rules do not change as a result of changes in the environment surrounding network request manager 102. The static rules only change when the system administrator redefines them. Again, rules module 204 must ensure that the data that is the subject of the client request is within the data set common to the selected group.

In a preferred embodiment, rules module 204 rewrites the client request according to the one or more static rules. The client request as rewritten by rules module 204 specifies the selected group. Each static rule includes a source string pattern and a substitution rule. Putting aside conditional step 602 for the moment, in step 604 rules module 204 searches the client request for the source string pattern associated with the static rule currently being applied. For example, if the source string pattern is "map," then rules module 204 searches the client request for each occurrence of "map." Rules module 204 searches all the information parsed from the client request by server module 202.

In step 606, rules module 204 modifies the client request at each occurrence of the source string pattern according to the corresponding substitution rule. The substitution rule defines how the client request will be altered as a result of each occurrence of the source string pattern. For example, the substitution rule might simply state that the source string pattern be replaced by a substitution pattern. Alternatively, the substitution rule might cause a new string to be appended to the end of the URL when a particular source string pattern is found in the client data.

The substitution rule might also include tests of system information accessible by rules module 204 (e.g., time, date). For instance, client requests containing a source string pattern might be modified according to a first static rule during certain hours of the day, and modified according to another at other times. Those skilled in the art will recognize the myriad of possibilities for defining static rules in terms of source string patterns and substitution rules.

In a preferred embodiment, each static rule might further include a conditional statement. As indicated in step 602, if a conditional statement is included within a particular static rule, and if it is not satisfied, rules module 204 does not apply that static rule. The conditional statement might test any variable accessible to network request manager 102 (e.g., information parsed from the client request, system information). For example, certain static rules may only be applied during certain periods of the day, or to clients using a particular type of network browser. Those skilled in the art will recognize that including a conditional statement in a static rule is not necessary, but adds additional flexibility to the process of selecting an appropriate group.

This process of searching for source string patterns and modifying the client request according to substitution rules therefore defines how a group is selected and, further, provides an indication of the selected group. Those skilled in the art will also recognize that this is only one of many possible implementations of rules module 204. Other implementations can be envisioned which perform the same function of applying one or more static rules to select a group based on data parsed from the client request. For example, more sophisticated static rules might be defined, wherein the client request is more thoroughly tested. This might allow for a more robust decision making process, but would require a more complex rules module 204 and would slow execution speed.

In step 608, rules module 204 determines whether all the static rules have been applied. If not, the next static rule is applied, beginning with step 602. If all of the static rules have been applied, rules module 204 passes the modified client request on to a particular policy module 206. As described above, in a preferred embodiment the rewritten client request now specifies the selected group.

Policy Module

As is indicated in FIG. 2, one or more policy modules 206 are coupled to rules module 204. Each group of content servers 106 has associated with it a policy module 206 responsible for distributing client requests amongst the content servers 106 forming the group. Therefore, network request manager 102 can accommodate a number of groups less than or equal to the number of policy modules 206.

Figure 7:
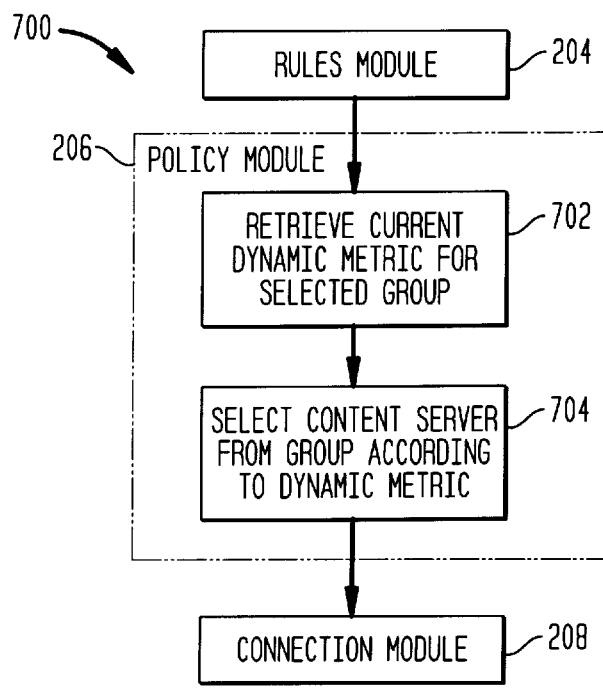
FIG. 7 is a data flow diagram providing further details related to the operation of the policy module in a preferred embodiment.

FIG. 7 is a data flow diagram 700 illustrating in greater detail the operations performed by each policy module 206. Policy module 206 selects which content server 106 within the group selected by rules module 204 will service the client request. Policy module 206 makes this selection according to a dynamic metric.

In step 702, policy module 206 retrieves the current dynamic metric for the selected group. In a preferred embodiment, a separate process is initiated at start-up which maintains a dynamic metric for each group of content servers 106. The metric is dynamic in the sense that it measures a time-varying characteristic associated with each content server within a group. The metric is recalculated over time to capture the characteristic's time-varying nature. The recalculations may occur periodically, or on some non-periodic schedule. Thus, in step 702 policy module 206 loads the current (i.e., the most recently measured) dynamic metric in order to get the most accurate temporal estimate.

In a preferred embodiment, the dynamic metric includes a measurement of each content server's available processing capacity, hereinafter referred to as a performance characteristic. These performance characteristics must be expressed in the same units, and in a preferred embodiment the values are normalized so that their sum for each group is 1; each performance characteristic therefore ranges from 0 to 1. Larger performance characteristics indicate content servers which have greater excess processing capacity relative to other content servers within the group.

Figure 8A:
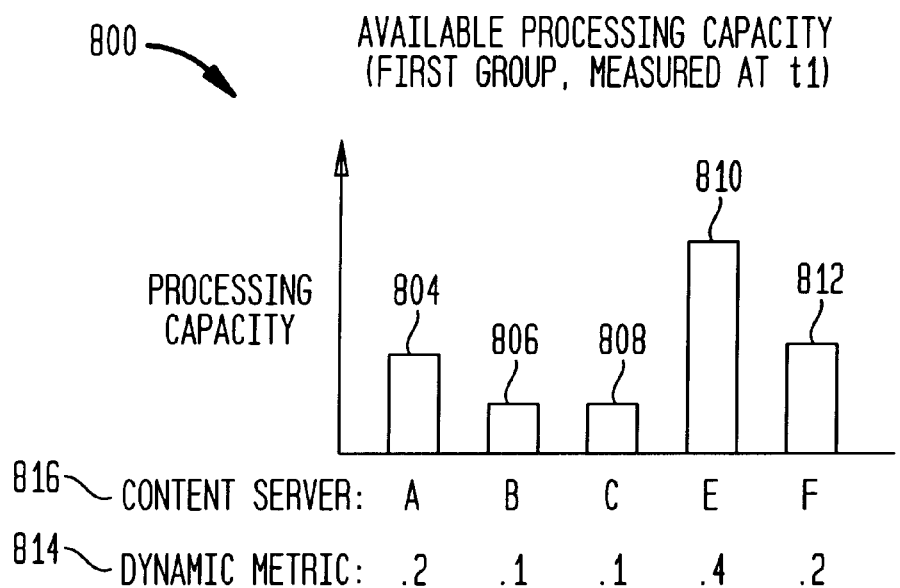
FIGS. 8A and 8B are a diagram illustrating a preferred embodiment of the dynamic metric used by the policy module, where the dynamic metric is measured at a first time (FIG. 8A) and a second time (FIG. 8B)
Figure 8B:
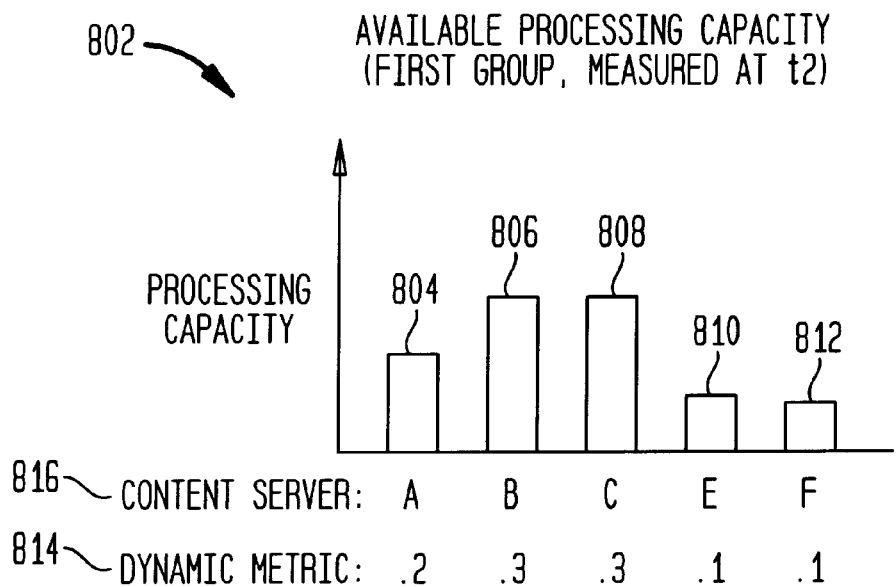

FIGS. 8A and 8B present an example dynamic metric measured at two points in time. FIG. 8A is a graph 800 illustrating dynamic metric 814 measured at first time (t1) corresponding to first group 502 as shown in FIG. 5. First group 502 includes five content servers: A, B, C, E, and F. Graph 800 depicts the measured available processing capacity (i.e., the performance characteristic) for each content server. Dynamic metric 814 indicates the numeric performance characteristic for each content server 106.

Content server E has the greatest available processing capacity, relative to the others in the group, as indicated by its performance characteristic 810 of 0.4. Conversely, content servers B and C have the least available processing capacity as indicated by performance characteristics 806 and 808 of 0.1. Defining dynamic metric 814 in this way allows policy module 206 to distribute client requests to those content servers 106 best able to handle additional processing burdens.

Those skilled in the art will recognize that the performance characteristic might be measured in a number of different ways. One approach might be to install special software on each content server 106 that monitors that content server's available processing capacity and periodically reports this information to policy module 206. This approach provides for a very accurate measurement. However, the monitoring software itself consumes some of the resources of content server 106, and the reporting messages increase network message traffic.

In a preferred embodiment, the performance characteristic is measured by monitoring the time it takes for a particular content server 106 to respond to past S client requests. This approach results in a rough estimate of the content server's available processing capacity: a quick response time indicates the machine is lightly loaded, a slow response time indicates the reverse. This approach was found to strike a good balance between measurement accuracy and the burdens associated with taking and reporting the measurement.

Referring back to FIG. 7, in step 704, policy module 206 selects a content server 106 to service each client request according to dynamic metric 814. In a preferred embodiment, this selection is performed by generating a random number in the range of 0 to 1 and comparing the number to dynamic metric 814. For instance, suppose first group 502 receives a new client request shortly after dynamic metric 814 was measured at t1. Policy module 206 generates a random number of 0.5, and compares the number to dynamic metric 814 as follows:

| Random number is: greater than or equal to | but less than | Policy module 206 selects content server: |
|---|---|---|
| 0 | 0.2 | A |
| 0.2 | 0.3 | B |
| 0.3 | 0.4 | C |
| 0.4 | 0.8 | E |
| 0.8 | 1.0 | F |

Thus, in this example policy module 206 selects content server E to service this client request. Those skilled in the art will recognize that many different methods might be used to select a content server 106 from the group according to dynamic metric 814. The salient point is that policy module 206 attempts to distribute a greater percentage of new client requests to those content servers 106 best able to service the requests based upon having greater available processing capacity.

FIG. 8B is a graph 802 illustrating dynamic metric 814 measured at a second time (t2). As can be seen, the relative available processing capacity of the content servers has now changed. Performance metric 810 representing content server E has decreased from 0.4 to 0.1. This drop in performance metric (i.e., drop in available processing bandwidth) could be due to having received a greater percentage of new client requests during the period between t1 and t2. The drop could also be due to any number of other factors, such as other processing demands being placed on content server E by local users or having received particularly taxing client requests during the interval.

By using a dynamic rather than static metric, the present invention is able to adjust the distribution of new client requests over time to account for changing conditions which affect content servers 106 within the group. Typically, the goal of each policy module 206 will be to maintain an even distribution of processing burdens across the content servers in the group, including all processing burdens affecting the content servers.

However, in a preferred embodiment, network request manager 102 may be customized to operate according to a user's particular needs. Certain policy modules 206 might distribute client requests so that burdens are not evenly distributed. Certain situations may demand that some content servers be tasked with carrying a disproportionate share of the processing burdens. Further, policy modules 206 may be defined in conjunction with certain static rules within rules module 204 so that certain policies are implemented only under certain circumstances. For instance, client requests might be distributed according to a first policy during certain hours of the day, and according to an alternative policy at other times. In a preferred embodiment, network request manager 102 may easily access customized policy modules as dynamically loaded shared objects.

As shown in FIG. 7, once policy module 206 has selected a content server 106 to service the client request, control passes to connection module 208.

Connection Module

Once policy module 206 as selected a content server 106 to service a client request, connection module 208 causes a connection to be established with that content server 106. In a preferred embodiment, this may be accomplished in one of two modes of operation as depicted in FIGS. 9A and 9B.

Figure 9A:
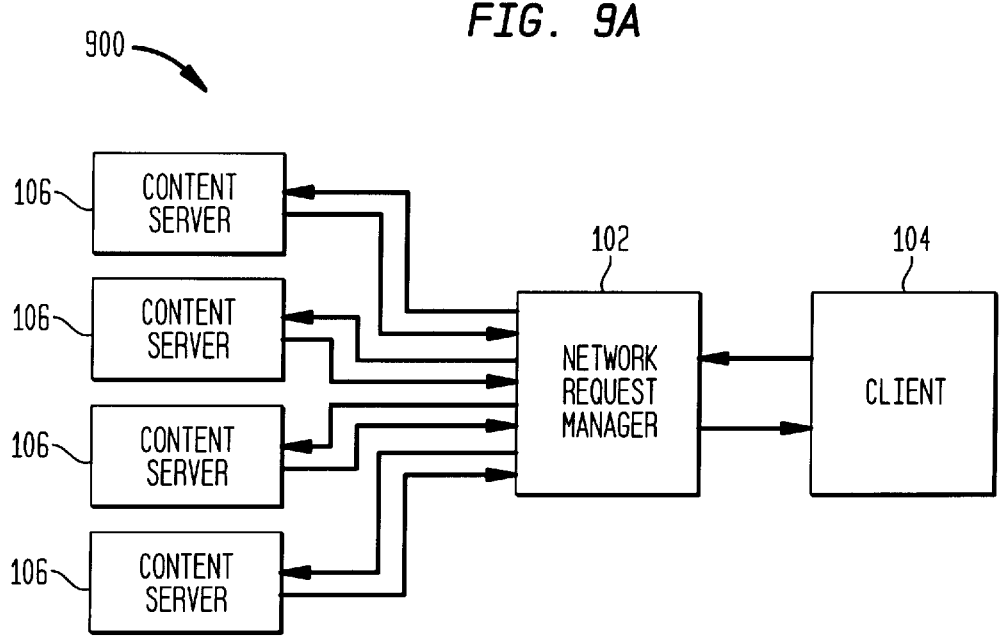
FIG. 9A is a system diagram illustrating the operation of the present invention in a proxy mode.

FIG. 9A is a diagram 900 illustrating network request manager 102 in a proxy mode of operation. Network request manager 102 receives a client request from client 104. In proxy mode, network request manager 102 selects an appropriate content server 106 and forwards the client request on to the selected content server 106. Content server 106 services the client request and returns the results to network request manager 102. Network request manager then passes the results on to client 104. Thus, network request manager 102 acts as a proxy for client 104 when servicing the client request with content server 106. It appears to client 104 that network request manager 102 has serviced the client request: the proxy operation is invisible to client 104.

Figure 9B:
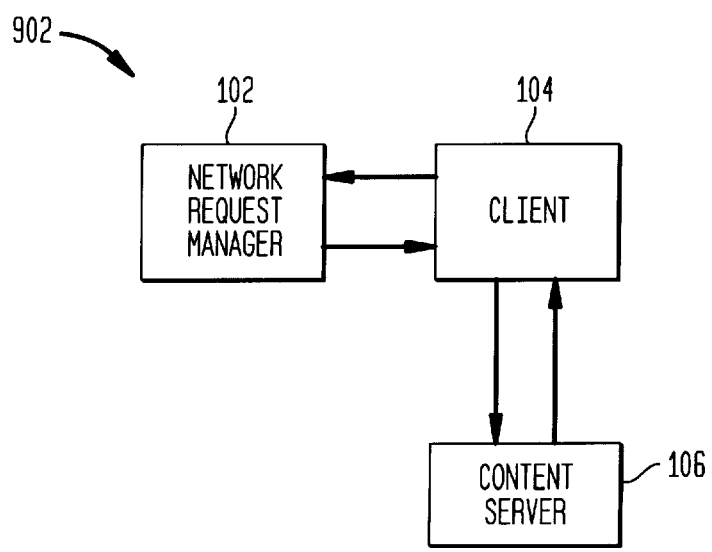
FIG. 9B is a system diagram illustrating the operation of the present invention in a redirect mode.

FIG. 9B is a diagram 902 illustrating network request manager 102 in a redirect mode of operation. In redirect mode, network request manager 102 receives the client request and selects an appropriate content server 106 as before. Here, however, network request manager 102 responds to the client request with information that will allow client 104 to contact content server 106 directly. For example, network request manager 102 might respond with the web site address of content server 106. Using this information, client 104 re-transmits the client request to content server 106 and receives the results directly.

Connection module 208 (not shown in FIG. 9B, see FIG. 2) selects a mode of operation based on certain criteria, hereinafter referred to as redirection criteria. In a preferred embodiment, the proxy mode is the default mode of operation. The connection module 208 uses the redirect mode only when the redirection criteria are satisfied. Example redirection criteria are discussed below.

Proxy Module

FIG. 10 is a dataflow diagram 1000 illustrating the operation of the present invention in a proxy mode of operation. As discussed above, rules module 204 selects a group and policy module 206 selects a specific content server 106 from within that group. For purposes of illustration, FIG. 10 shows rules module 204 as having chosen first group 502, as described with respect to FIG. 5. Again, first group 502 includes content servers A, B, C, E, and F, all of which being able to access common data set 1006.

Continuing with the example, policy module 206 accesses the current dynamic metric and selects content server F to service the client request. Assuming that the redirection criteria have not been satisfied (see below), control passes to proxy module 210 within connection module 208. Proxy module forwards the client request to content server F for servicing. Content server F accesses common data set 1006 as necessary to service the client request, and returns to proxy module 210 an indication that the client request has been completed and any results that may have been generated. Proxy module 210 then responds to client 104 with the information received from content server F (i.e., an indication that the client request was fulfilled along with any results).

In a preferred embodiment, proxy module 210 handles most failures of a content server 106 without disruption to client 104. Proxy module 210 merely has to re-query policy module 206 for a new content server 106 whenever the original content server fails to service the client request for whatever reason. If the failed content server was the last in the selected group, network request manager 102 might report the failure to client 104, with instructions to try again at a later time. However, in a preferred embodiment, proxy module 210 under these circumstances forwards the client request to a default content server 106. The default content server 106 services client requests from any proxy module 210 which was unable to provide a content server 106l to service the request. Those skilled in the art will recognize that these client requests might alternatively be directed to a default policy module 206 representing a group of default content servers 106.

Redirect Module

Figure 11:
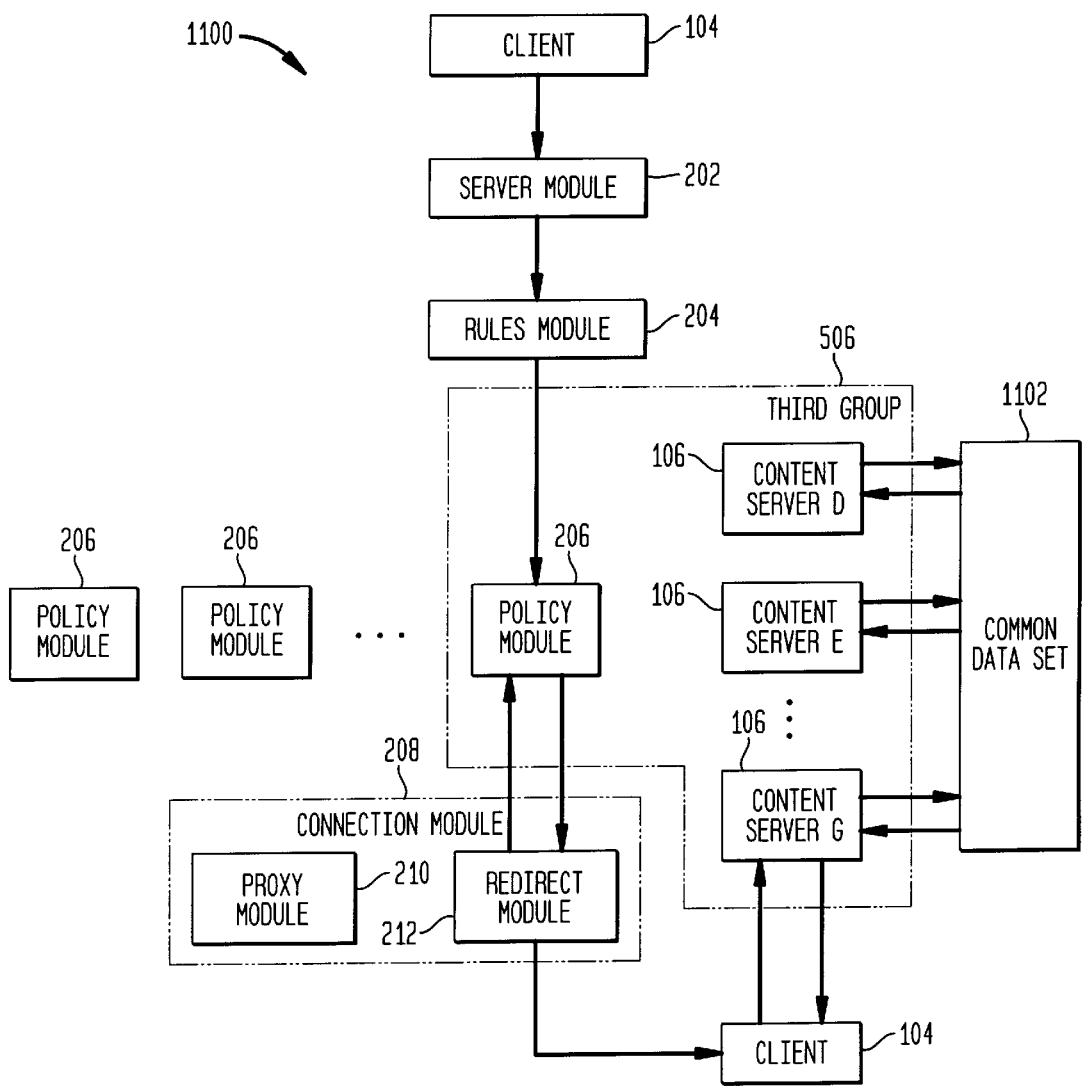
FIG. 11 is a data flow diagram illustrating the operation of the present invention in a redirect mode.

FIG. 11 is a dataflow diagram 1100 illustrating the operation of the present invention in a redirect mode of operation. For purposes of illustration, FIG. 11 depicts rules module 204 as having selected third group 506 including content servers D, E, F, and G, each of which are able to access common data set 1102. The policy module 206 associated with third group 506 accesses the current dynamic metric for this group and selects content server G to service this client request. Control then passes to connection module 208.

Connection module 208 tests to determine whether the redirection criteria are satisfied. In a preferred embodiment, the redirection criteria are satisfied when connection module 208 determines that a direct connection between content server 106 and client 104 would result in significantly more efficient communication.

For example, client 104 and content server 106 may both be physically located within a few miles of each other on the East coast while network request manager 102 might be located on the West coast. It makes little sense in terms of transmission time efficiency for network request manager 102 to act as a proxy when a direct connection is possible. Similarly, content server 106 and client 104 might be connected via a high-speed network link while both might share a low-speed link with network request manager 102. A direct connection makes more sense here as well.

Another example of a preferred redirection criteria is redirecting all of certain types of client requests. For instance, all client requests for a network intensive interactive application might be redirected automatically where acting in a proxy mode would be too burdensome in terms of network bandwidth. Those skilled in the art will recognize the multitude of different redirection criteria which might be used.

Assuming that the redirection criteria have been satisfied, control passes to redirect module 212 within connection module 208. As described above, redirect module 212 responds to client 104 with whatever information is necessary according to the particular wide-area network 108 protocol for client 104 to contact content server G directly. In most cases the network address of the content server 106 is all that is required. Client 104 then contacts content server G directly with the client request and receives directly whatever response is provided.

Data Cache

In a preferred embodiment, the present invention implements two caching schemes to improve performance in terms of time required to respond to client requests. The first, data cache 216, is shown in FIG. 2.

Data cache 216 operates according to conventional data caching principles. When a new client request is received by network request manager 102, data cache 216 is checked to determine whether the data that is the subject of the client request is available. If the data is available in data cache 216, network request manager 102 may respond immediately to client 104 without having to select and query a content server 106.

Those skilled in the art will recognize that different types of data might be included within data cache 216. In a preferred embodiment, static rules included within rules module 204 define which client requests will be stored within data cache 216. A static rule can be used to indicate that certain client requests should always be stored within data cache 216. Alternatively, a static rule can be used to indicate that certain client requests should never be stored within data cache 216. The cache rules are applied along with the others and a flag is set to indicate data which should be stored. This allows precise control over what types of data are stored within data cache 216.

For instance, static rules might be defined such that data cache 216 stores only files which are the subject of "GET" requests, a common request received by network web sites. Where caching all GET requests places too heavy a burden on network request manager 102, static rules can be defined such that only requests for certain types of files are stored within data cache 216. In a preferred embodiment, GET requests for "static pages" (i.e., files that are not likely to have changed since they were last accessed) are stored in data cache 216 while "dynamic pages" (i.e., files that are generated dynamically for each specific client request) are not.

Those skilled in the art will also recognize that data cache 216 might be queried at different points in the operation of network request manager 102. For instance, as described above, data cache 216 might be queried upon receipt of a new client request. Alternatively, data cache 216 might be queried after the client request has been rewritten by rules module 204 and policy module 206. Those skilled in the art will recognize the trade-offs inherent in this design decision. Querying data cache 216 immediately upon receipt allows for a quicker response. However, additional flexibility is gained by querying data cache 216 after the client request has been rewritten. For instance, client requests may map to different documents at different times, according to one or more particular static rules. In this case, data cache 216 must be queried after the application of the one or more static rules to the client request, so that the proper document is retrieved.

Connection Cache

In a preferred embodiment, a connection cache 214 is also employed to improve performance. Connection cache 214 is included within connection module 208 and communicates with proxy module 210, as shown in FIG. 2. Note that connection cache 214 does not communicate with redirect module 212. As described above, redirect module 212 provides client 104 with the information necessary to establish a direct connection between the client and content server 106. Redirect module 212 does not itself establish connections with content servers 106 and therefore has no need to either access connection cache 214 or store information therein.

Figure 12:
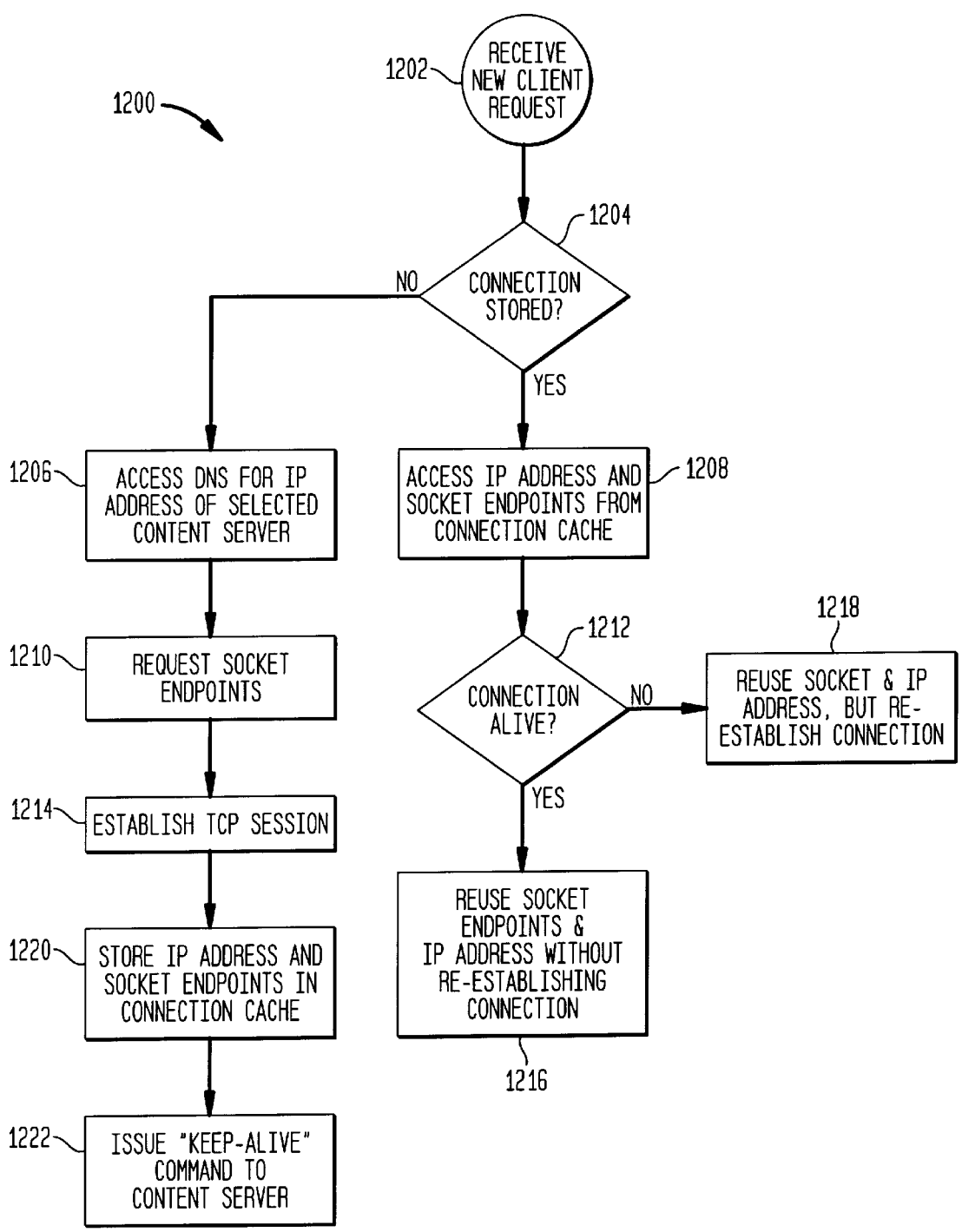
FIG. 12 is a flow chart illustrating the operation of a connection cache in a preferred embodiment of the present invention.

FIG. 12 is a flowchart 1200 depicting the operations associated with connection cache 214. In step 1202, connection module 208 receives a new client request from policy module 206. As shown in FIG. 3, at this point in the data flow a content server 106 has been selected to service the client request by the operation of rules module 204 and policy module 206. Also for purposes of the following discussion, assume that proxy module 210 will establish the connection with content server 106, since redirection module 212 does not utilize connection cache 214.

In step 1204, proxy module 210 determines whether a past connection to the selected content server 106 has been stored in connection cache 214. If this is the first connection to this particular content server 106, or if the connection has been purged from the cache for whatever reason, proxy module 210 must establish a new connection.

In steps 1206, 1210, and 1214 proxy module 210 establishes a connection with the selected content server 106. Those skilled in the art will recognize that many different network protocols exist and that each might vary in how connections are established. Thus, the actions described with respect to steps 1206, 1210, and 1214 merely illustrate one common approach and should not be construed as providing a definitive or singular approach.

In step 1206, proxy module 210 accesses the Domain Name Service (DNS) for the IP address of the selected content server 106. Those skilled in the art will recognize that the DNS may alternatively be accessed once, at start-up, for the IP address of each content server 106 for which network request manager 102 acts as an intermediary. These IP addresses are stored in memory and accessed by proxy module 210 as necessary.

In step 1210, proxy module 210 requests a socket endpoint by executing an appropriate function call. Then, in step 1214, proxy module 210 uses the IP address and socket endpoint to establish a connection with the selected content server 106. The data required by proxy module 210 to establish a connection will hereinafter be referred to as connection data. In this case connection data includes an IP address and a socket endpoint.

In a preferred embodiment, proxy module 210 in step 1220 stores the connection data associated with the newly opened connection in connection cache 214. Those skilled in the art will recognize that the exact connection data stored in connection cache 214 will vary depending upon the specific network protocol being followed. Preferably, connection data includes any information related to a network connection which may be reused in subsequent attempts to re-establish that same connection.

In step 1222, proxy module 210 attempts to keep each content server connection open by issuing a HTTP "keep-alive" message over the network to content server 106. This will cause content server 106 to keep the connection open for a certain period of time before the connection "times-out." The network protocol will determine how this is accomplished and how long the connection will be held open. Subsequent client requests accessing the same content server 106 will now be able to avoid some of these steps required to establish a network connection.

Referring back to step 1204, if proxy module 210 finds that a past connection has been stored in connection cache 214, proxy module 210 now finds the connection data stored in connection cache 214 so long as the data has not been purged due to the cache becoming overloaded. Connection cache 214 might be purged of old data when it becomes full according to conventional caching techniques. Alternatively, connection cache 214 may be designed to have sufficient memory to store connection data for all content servers 106, given that the number of content servers 106 is known to network request manager 102 and in many cases will be a reasonable figure.

In a preferred embodiment, connection cache 214 stores multiple connections for content servers 106 which are accessed more often than others. By storing multiple connections, content servers 106 that are accessed more have a larger pool of cached connections to draw from.

In step 1208, proxy module 210 accesses the IP address and socket endpoint associated with the connection to the selected content server 106 from connection cache 214.

In step 1212, proxy module 210 determines whether the connection with the selected content server 106 remains open. In a preferred embodiment, proxy module 210 merely transmits the client request to content server 106 assuming that the connection remains open. If the connection is still open, content server 106 accepts the client requests and processing proceeds normally in step 1216 having avoided the burdens of accessing a socket endpoint and an IP address and re-establishing a connection.

If an error message is received indicating that no connection exists, in step 1218 proxy module 210 must re-establish a connection but may reuse the socket endpoint and IP address retrieved from connection cache 214.

Pinger Module

Pinger module 218 is shown in FIG. 2 as being connected for two-way communication to local network 110. In a preferred embodiment, pinger module 218 monitors two lists of content servers: content servers 106 which were unreachable by proxy module 210, and all content servers 106 contacted by redirect module 212.

For content servers 106 handled by proxy module 210, there is no need for a separate monitoring process to determine when any of these content servers 106 have gone down. Proxy module 210 merely notifies pinger module 218 when a particular content server 106 fails to respond to a communication transmitted by proxy module 210. Pinger module 218 adds this content server 106 to the first list. Pinger module 218 notifies each policy module 206 that the dead content server 106 should be removed from their dynamic metric until further notice. Pinger module 218 then monitors each content server 106 on the first list until the content server again responds, as described below.

Redirect module 212 has no direct contact with the content servers 106 which it handles and would therefore have no way of knowing that a content server 106 was not responding absent some monitoring process. Therefore, the second list monitored by pinger module 218 is the list of content servers 106 handled by redirect module 212. Again, when pinger module 218 detects that one of the content servers 106 has gone down, for whatever reason, each policy module 206 is notified so that the content server 106 may be removed from their dynamic metric. When the content server 106 comes back up, each policy module 206 is notified so that the content server 106 may be returned to the dynamic metric.

Pinger module 218 monitors the content servers 106 on each list in the same manner. In a preferred embodiment, pinger module 218 merely places the content server lists into a queue and pings one at a time. When a particular content server 106 gets to the front of the queue, pinger module 218 "pings" the content server 106 by opening a network connection, issuing a test request, and waits to see if a result comes back. If content server 106 does not respond within a set amount of time, it is presumed to be down.

Thus, content servers 106 in the first list which respond are removed, and the policy modules 206 are notified that they may return the content server 206 to their dynamic metrics (if the content server is a member of that particular group). By comparison, content servers 106 on the second list are not removed from the list so long as they continue to be handled by redirect module 212. Pinger module 218 maintains a record of whether each content server 106 on the second list is up or down, and notifies the policy modules 206 of any changes in status.

Configurations of Network Request Managers

Figure 13:
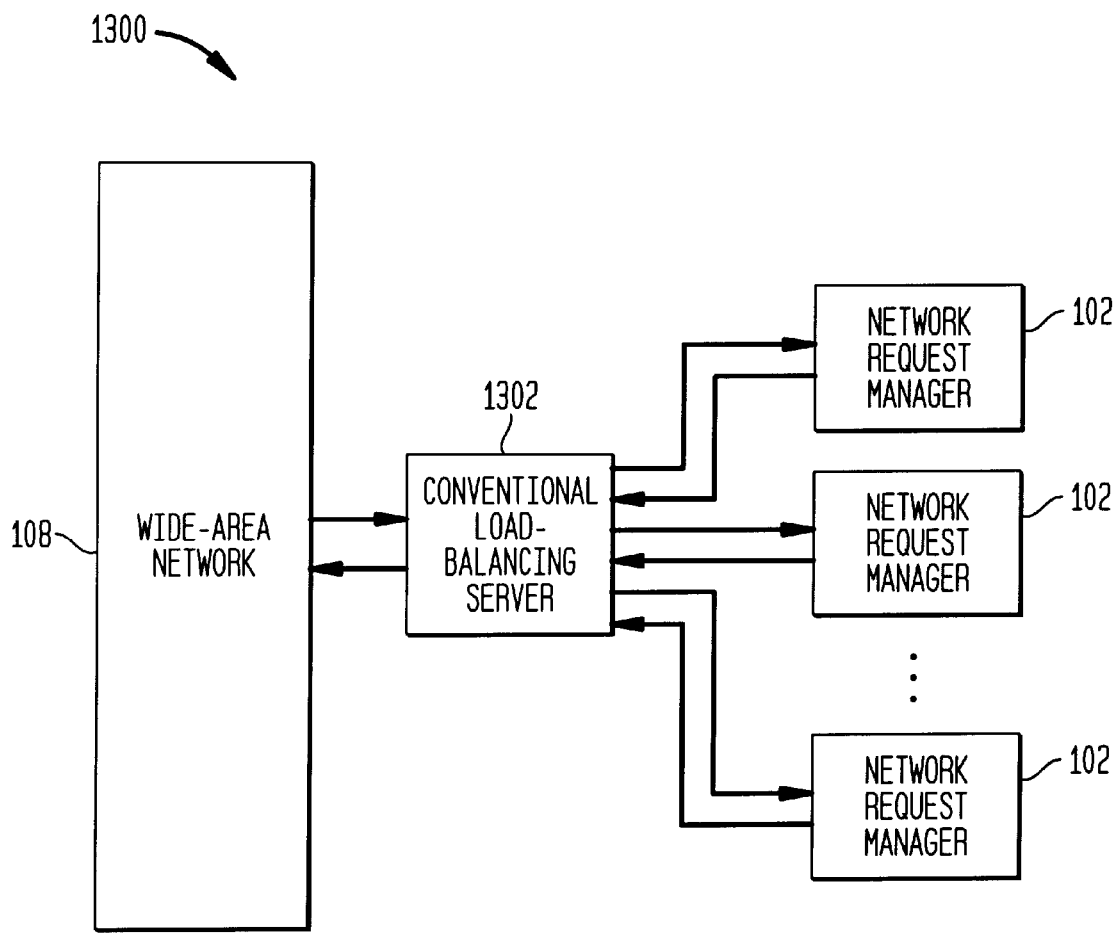
FIG. 13 is a diagram 1300 depicting one example of how multiple network request managers 102 can be configured.

Multiple network request managers 102 might be efficiently used in different configurations, depending upon the requirements of the particular digital network environment 100. Those skilled in the art will recognize that multiple network request managers 102 might operate in a "fail-safe" mode. In this configuration, one network request manager 102 actually handles client requests received from wide-area network 108, while the other network request managers 102 monitor the status of the first. If the first network request manager 102 fails, for whatever reason, one of the others takes over responsibility for handling incoming client requests.

Where the volume of client requests is greater than a single network request manager 102 can handle, several network request managers 102 might operate in parallel with each handling a portion of the volume. FIG. 13 is a diagram 1300 depicting one example of how multiple network request managers 102 might be configured.

A conventional load-balancing server 1302 is preferably used to receive client requests from wide-area network 108 and to distribute them amongst two or more network request managers 102. A conventional load-balancing server functions well in this capacity. Although the convention load-balancing server is less sophisticated than the network request manager 102 described above, it is, as a result, often able to more quickly distribute client requests according to a simple distribution scheme. For example, some conventional load-balancing servers 1302 simply utilize a uniform distribution scheme where client requests are distributed uniformly.

Those skilled in the art will recognize that a uniform distribution scheme might be implemented in any number of ways. For example, client request might be distributed randomly, where a random number generator follows a statistically uniform distribution. Alternatively, conventional load-balancing server 1302 might utilize a "round-robin" scheme, where each network request manager 102 receives a client request in turn.

V. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A network request manager for handling client requests received from clients via a digital network, comprising:

a server module configured to receive a client request from the digital network;

a rules module configured to apply one or more static rules to said client request to select a plurality of content servers;

a policy module configured to select a target content server from said plurality of content servers according to a dynamic metric;

a connection module configured to cause a connection to be established with said target content server so that said target content server may service said client request; and a data cache configured to store data retrieved from said target content server according to said client request, said data cache further configured to service said client request whenever said client request seeks data stored in said data cache, thereby enabling the network request manager to respond immediately to said client request without having to select and query said target content server;

wherein said connection module comprises a redirect module configured to respond to said client request with redirection information when redirection criteria are satisfied, thereby allowing the client to directly establish said connection to said target content server.

2. The network request manager of claim 1, wherein said rules module rewrites said client request to indicate said plurality of content servers, and wherein said policy module rewrites said client request to indicate said target content server.

3. The network request manager of claim 2, wherein each of said static rules comprises a source string pattern and a substitution rule, and wherein said rules module applies each of said static rules by modifying said client request according to said substitution rule at each occurrence of said source string pattern in said client request.

4. The network request manager of claim 3, wherein each of said static rules further comprises a conditional statement, and wherein said rules module only applies each of said static rules when said conditional statement is satisfied.

5. The network request manager of claim 1, wherein each content server within said plurality of content servers has access to a common data set.

6. The network request manager of claim 1, wherein said client request includes client data, and wherein said rules module is further configured to apply said one or more static rules to said client data and to system information when selecting said plurality of content servers.

7. The network request manager of claim 1, wherein said dynamic metric comprises a performance characteristic for each content server in said plurality of content servers, said performance characteristic indicative of each content server's available processing bandwidth, and wherein said policy module selects said target content server according to said dynamic metric by choosing said target content server from said plurality of content servers where the probability of each content server being chosen is defined by said performance characteristic.

8. The network request manager of claim 7, wherein said policy module updates said performance characteristic for each content server in said plurality of content servers based on each content server's response time.

9. The network request manager of claim 1, wherein the digital network is a TCP/IP network.

10. The network request manager of claim 9, wherein at least one content server of said plurality of content servers is coupled to said TCP/IP network, and at least one other content server of said plurality of content servers is coupled to a local network accessible to said network request manager.

11. The network request manager of claim 10, wherein said client request includes a Uniform Resource Locator (URL) address.

12. The network request manager of claim 1, wherein said rules module is further configured to apply said one or more static rules to said client request in order to determine whether said data retrieved from said target content server will be saved in said data cache.

13. The network request manager of claim 1, wherein said connection module further comprises a connection cache configured to store connection data related to said connection, and wherein said connection module is further configured to check said connection cache for said connection data before causing said connection to be established.

14. The network request manager of claim 13, wherein said connection cache is further configured to store multiple connections for one or more of said content servers.

15. The network request manager of claim 1, wherein said connection module further comprises a proxy module configured to interact with said target content server as a proxy for the client while said target content server services said client request.

16. The network request manager of claim 15, wherein said proxy module is further configured to request a new target content server from said policy module when said target content server is inaccessible.

17. The network request manager of claim 16, wherein said proxy module is further configured to select a default content server as said target content server whenever said policy module is unable to provide said new target content server.

18. The network request manager of claim 15, further comprising a pinger module, coupled to said connection module and to said policy module, configured to monitor the active/inactive status of each of said content servers handled by said redirect module, and further configured to monitor the active/inactive status of each of said content servers determined to be inactive by said proxy module.

19. A method for handling client requests received from clients via a digital network, comprising the steps of:
  a. receiving a client request from the digital network;
  b. applying one or more static rules to said client request to select a plurality of content servers, wherein each content server within said plurality of content servers has access to a common data set;
  c. selecting a target content server from said plurality of content servers according to a dynamic metric;
  d. establishing a connection with said target content server so that said target content server may service said client request; and
  e. storing data retrieved from said target content server in a data cache, and wherein said step of receiving a client request comprises the steps of servicing said client request whenever said client request seeks data stored in said data cache, and responding immediately to said client request without having to select and query said target content server;

wherein said step of establishing a connection comprises the step of responding to said client request with redirection information when redirection criteria are satisfied, thereby allowing a client to establish said connection to said target content server directly.

20. The method of claim 19, wherein said step of selecting a plurality of content servers comprises a step of rewriting said client request according to said one or more static rules, including:
  i. defining a source string pattern and a substitution rule for each of said static rules; and
  ii. for each of said static rules, searching said client request for each occurrence of said source string pattern and modifying said client request according to said substitution rule at each occurrence of said source string pattern in said client request.

21. The method of claim 19, wherein said dynamic metric comprises a performance characteristic for each content server in said plurality of content servers, and wherein said step of selecting a target content server according to said dynamic metric comprises the step of choosing said target content server from said plurality of content servers where the probability of each content server being chosen is defined by said performance characteristic.

22. The method of claim 21, wherein said step of selecting a target content server according to said dynamic metric further comprises the step of updating said performance characteristic for each content server in said plurality of content servers based on each content server's response time.

23. The method of claim 19, wherein said step of selecting a plurality of content servers comprises the step of determining whether said data retrieved from said target content server will be saved in said data cache.

24. The method of claim 19, further comprising the step of saving connection data related to said connection in a connection cache, and wherein said step of establishing a connection comprises the step of checking said connection cache for said connection data before establishing said connection.

25. The method of claim 19, wherein said step of establishing a connection comprises the step of requesting a new target content server chosen from said plurality of content servers when said target content server is inaccessible.

26. A network request manager for handling a client request received from a client via a digital network, comprising:

means for selecting a plurality of content servers by applying one or more static rules to the client request, wherein each content server within said plurality of content servers has access to a common data set;

means for selecting a target content server from said plurality of content servers according to a dynamic metric;

means for establishing a connection with said target content server so that said target content server may service the client request; and means for storing data retrieved from said target content server according to the client request, said means for storing data further configured to service the client request whenever the client request seeks data stored in said means for storing data, thereby enabling the network request manager to respond immediately to the client request without having to select and query said target content server;

wherein said means for selecting a plurality of content servers comprises a means for rewriting the client request according to each of said static rules, including:

means for defining a source string pattern and a substitution rule for each of said static rules; and means for searching said client request for each occurrence of said source string pattern and modifying said client request according to said substitution rule at each occurrence of said source string pattern in said client request;

wherein said means for establishing a connection comprises means for responding to the client request with redirection information when redirection criteria are satisfied, thereby allowing the client to directly establish said connection to said target content server.

27. A network request manager for handling a client request received from a client via a digital network, comprising:

means for selecting a plurality of content servers by applying one or more static rules to the client request, wherein each content server within said plurality of content servers has access to a common data set;

means for selecting a target content server from said plurality of content servers according to a dynamic metric;

means for establishing a connection with said target content server so that said target content server may service the client request; and means for storing data retrieved from said target content server according to the client request, said means for storing data further configured to service the client request whenever the client request seeks data stored in said means for storing data, thereby enabling the network request manager to respond immediately to the client request without having to select and query said target content server;

wherein said dynamic metric comprises a performance characteristic for each content server in said plurality of content servers, and wherein said means for selecting a target content server according to said dynamic metric comprises means for randomly choosing said target content server from said plurality of content servers where the probability of each content server being chosen is defined by said performance characteristic;

wherein said means for establishing a connection comprises means for responding to the client request with redirection information when redirection criteria are satisfied, thereby allowing the client to directly establish said connection to said target content server.

28. A computer program product, comprising a computer useable medium having computer program logic stored therein, wherein said computer program logic comprises:

a receiver that enables a computer to receive a client request from a digital network;

a rules applier that enables said computer to apply one or more static rules to said client request to select a plurality of content servers, wherein each content server within said plurality of content servers has access to a common data set;

a selector that enables said computer to select a target content server from said plurality of content servers according to a dynamic metric;

a connector that enables said computer to establish a connection with said target content server so that said target content server may service said client request; and a data cache that enables the computer to store data retrieved from said target content server according to said client request, said data cache further configured to service said client request whenever said client request seeks data stored in said data cache, thereby enabling the computer program product to respond immediately to said client request without having to select and query said target content server;

wherein said rules applier enables said computer to rewrite said client request to indicate said plurality of content servers, and wherein said selector enables said computer to rewrite said client request to indicate said target content server;

wherein said connector comprises a redirector that enables said computer to respond to said client request with redirection information when redirection criteria are satisfied, thereby allowing the client to directly establish said connection to said target content server.

29. The computer program product of claim 28, wherein each of said static rules comprises a source string pattern and a substitution rule, and wherein said second means enables said computer to apply each of said static rules by modifying said client request according to said substitution rule at each occurrence of said source string pattern in said client request.

30. A computer program product, comprising a computer useable medium having computer program logic stored therein, wherein said computer program logic comprises:

a receiver that enables a computer to receive a client request from a digital network;

a rules applier that enables said computer to apply one or more static rules to said client request to select a plurality of content servers, wherein each content server within said plurality of content servers has access to a common data set;

a selector that enables said computer to select a target content server from said plurality of content servers according to a dynamic metric;

a connector that enables said computer to establish a connection with said target content server so that said target content server may service said client request; and a data cache that enables the computer to store data retrieved from said target content server according to said client request, said data cache further configured to service said client request whenever said client request seeks data stored in said data cache, thereby enabling the computer program product to respond immediately to said client request without having to select and query said target content server;

wherein said dynamic metric comprises a performance characteristic for each content server in said plurality of content servers, said performance characteristic indicative of each content server's available processing bandwidth, and wherein said third means enables said computer to select said target content server according to said dynamic metric by choosing said target content server from said plurality of content servers where the probability of each content server being chosen is defined by said performance characteristic;

wherein said connector comprises a redirector that enables said computer to respond to said client request with redirection information when redirection criteria are satisfied, thereby allowing the client to directly establish said connection to said target content server.

31. The computer program product of claim 30, wherein said selector enables said computer to update said performance characteristic for each content server in said plurality of content servers based on each content server's response time.

32. A system for handling client requests received from clients via a digital network, comprising:

a plurality of network request managers; and a conventional load-balancing server coupled to receive a client request from the digital network and configured to distribute said client request to one of said plurality of network request managers according to a distribution scheme, wherein each of said network request managers comprises:

a server module configured to receive said client request from said conventional load-balancing server, a rules module configured to apply one or more static rules to said client request to select a plurality of content servers, a policy module configured to select a target content server from said plurality of content servers according to a dynamic metric, a connection module configured to cause a connection to be established with said target content server so that said target content server may service said client request; and a data cache configured to store data retrieved from said target content server according to said client request, said data cache further configured to service said client request whenever said client request seeks data stored in said data cache, thereby enabling the corresponding network request manager to respond immediately to said client request without having to select and query said target content server;

wherein said connection module comprises a redirect module configured to respond to said client request with redirection information when redirection criteria are satisfied thereby allowing the client to directly establish said connection to said target content server.

33. The system of claim 32, wherein said distribution scheme comprises uniform distribution.

* * * * *